United States Patent [19]

Welch et al.

[11] Patent Number: 4,720,663
[45] Date of Patent: Jan. 19, 1988

[54] BRUSHLESS MOTOR SPEED CONTROL

[75] Inventors: David W. Welch; Dennis R. McCully, both of Columbus, Miss.

[73] Assignee: United Technologies Electro Systems, Inc., Columbus, Miss.

[21] Appl. No.: 846,397

[22] Filed: Mar. 31, 1986

[51] Int. Cl.[4] .............................................. H02P 6/02
[52] U.S. Cl. ...................................... 318/341; 318/603; 318/254; 318/439; 318/327; 318/314; 318/318
[58] Field of Search ...................... 318/341, 599-611, 318/138, 254, 306, 308, 317, 318, 314, 326, 327, 328, 391, 392, 400, 403, 439, 443, 445, 621, 628

[56] References Cited

U.S. PATENT DOCUMENTS

| | | | |
|---|---|---|---|
| 3,379,944 | 4/1968 | Nuttall et al. | 318/608 X |
| 3,950,682 | 4/1976 | Dohanich | 318/341 X |
| 4,096,422 | 6/1978 | Fleming et al. | 318/318 X |
| 4,107,595 | 8/1978 | Campe | 318/254 X |
| 4,216,419 | 8/1980 | Dam et al. | 318/327 |
| 4,242,618 | 12/1980 | Minakuchi | 318/341 X |
| 4,242,619 | 12/1980 | Nakamura et al. | 318/314 |
| 4,254,,367 | 3/1981 | Sakamoto | 318/341 X |
| 4,398,339 | 7/1983 | Kimura | 318/254 |
| 4,414,495 | 11/1983 | Sumi et al. | 318/571 |
| 4,491,771 | 1/1985 | Kimura | 318/254 |
| 4,492,903 | 1/1985 | Knight et al. | 318/254 X |
| 4,525,657 | 6/1985 | Nakase et al. | 318/254 |
| 4,543,516 | 9/1985 | Kobori et al. | 318/327 X |
| 4,584,505 | 4/1986 | Chung et al. | 318/439 X |

Primary Examiner—William M. Shoop, Jr.
Assistant Examiner—Paul Ip
Attorney, Agent, or Firm—Robert P. Hayter

[57] ABSTRACT

A brushless DC motor control circuit for efficiently controlling motor speed is described. A digital circuit for providing centered pulse turn-on during that period when the specific winding is capable of providing torque for the desired direction of rotation to the rotor is described. Each phase has its own timing circuit including an initial delay-time interval and an on-time interval. These time intervals are set to obtain desired motor speed and efficient motor operation.

19 Claims, 6 Drawing Figures

BRUSHLESS MOTOR SPEED CONTROL

BACKGROUND OF THE INVENTION

The present invention relates to an electronic control for the commutation of brushless DC motors and further provides means to vary the speed of the motor by varying the duty cycle of electrical conduction within a phase winding of the motor. In addition to duty cycle variations, the timing of the conductance is such that it will occur in an optimum range within the torque cycle of a phase winding to maximize motor efficiency over a wide speed range.

The herein-described motor control circuit utilizes a centered pulse turn-on concept which is adaptable to operation with any number of phases in a motor. Each phase has its own on-time and delay time data generation. Based on this timing data each phase winding is energized only for a carefully selected portion of the time said phase winding is capable of generating torque for the desired direction of rotation of the rotor. Multiple phases, even if the torque cycles are overlapping, may be energized independently when most appropriate for each. The herein-described control could also be connected to energize each phase winding for the identical period during motor rotation such that all phases are energized for the same duty cycle adjusted to be initiated at the correct start time.

It has been recognized that torque in a unipolar driven motor may be applied by directing current in a single direction through a winding of the motor at a selected time relative to the rotor position. The force applied to the rotor with respect to the current applied, increases and decreases during this interval in which torque will be produced. By sensing the rotor position through the rotational angle during which current may be applied, it is possible to apply appropriate electrical power at the point where it is most efficient. By adjusting the length of time the electrical power is applied and the delay interval from the beginning of the potential torque producing angle to the time when the current is actually applied, it is possible to control both the amount of power applied and the speed of the motor.

An advantage of using a digitally-controlled motor speed control is that all inputs and outputs are compatible for use with a microprocessor control.

Although the invention is described relative to a unipolar-driven motor, it is likewise applicable for a bipolar-driven motor. Some additional logic may be necessary to determine when to appropriately apply current in a reverse direction to achieve the bipolar effect. Additionally, it may be desirable to have additional position sensing devices to indicate a different point on the motor's torque cycle on which the delay interval should begin.

SUMMARY OF THE INVENTION

It is an object of the present invention to provide a brushless DC motor speed control.

It is still a further object of the present invention to provide a motor control which allows for efficient motor operation while maintaining speed control.

A still further object of the present invention is to provide a brushless DC motor control which acts to apply positive torque at the most efficient portion of the torque cycle.

It is a yet further object of the present invention to provide separate delay-time intervals and on-time intervals such that the on-time may be positioned to optimize commutation for improved efficiency of the motor.

It is another object of the present invention to provide a DC motor control suitable for use with a microprocessor.

It is a yet further object of the present invention to provide a safe, economical, reliable, and easy to manufacture and assemble brushless DC motor control.

These and the above objects are achieved according to the preferred embodiment of the invention by the provision of a speed control circuit that receives an input signal from a rotor position detecting means and that provides an electrical pulse of duration and timing such that as the pulse is applied to an energizing circuit of the motor, the current will occur within the windings of the motor at such time with respect to the rotor in the motor to produce maximum torque and to sustain a preselected speed, and wherein an electrical pulse can be made to occur at any time during which a phase can produce torque.

Additionally, described is a control circuit for a brushless DC motor including a rotor position detecting means that provides a signal input to a frequency multiplier circuit and to a phase timing circuit, a delay-time register and an on-time register, each of which receives an input signal from the frequency multiplier, a phase timing circuit which receives a first signal from the rotor position detecting means, a second signal from the frequency multiplier and from the delay-time register and the on-time register, a driver circuit for each phase winding of the motor that receives a signal from the phase timing circuit and which supplies a pulse of current to the motor winding when the rotor within the motor is at one optimum position to produce maximum torque and for a duration to sustain a preselected rotor speed.

DESCRIPTION OF THE PREFERRED EMBODIMENT

The apparatus as described hereinafter will refer to a three-phase unipolar, brushless DC motor circuit control. It is to be understood that this circuit may likewise be utilized with motors having different numbers of circuits, with bipolar as well as unipolar motors, and with motors having a different number of phases.

Figure 1:
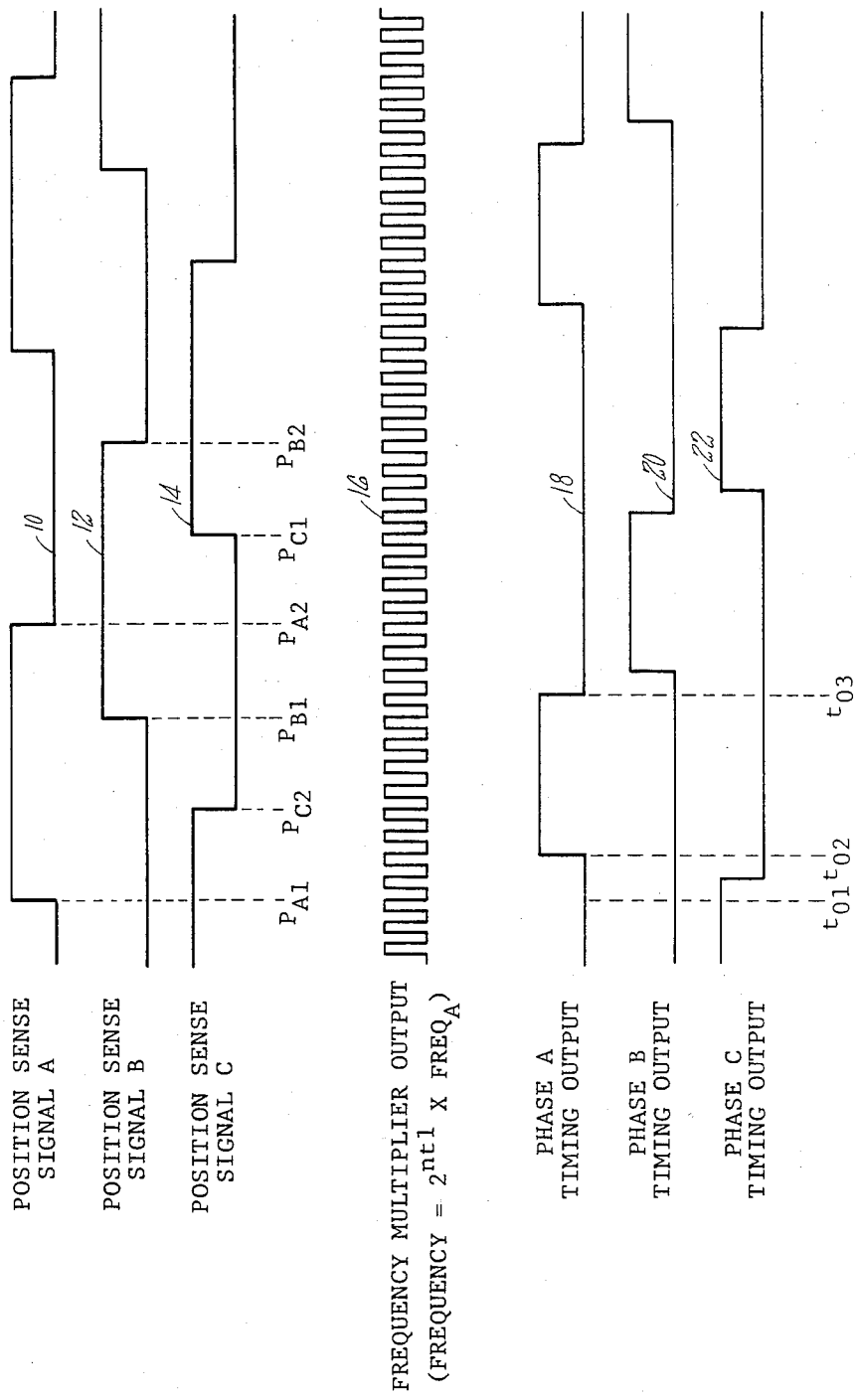
FIG. 1 is a representation of composite waveforms to illustrate the time relationships between various sets of signals.

FIG. 1 comprises a series of waveform signals to illustrate the inputs to and the functions of the control circuit. The three waveforms 10, 12, 14, labeled position sense signal A, position sense signal B, and position sense signal C, respectively indicate the signal received from rotor position sensing elements A, B, C, such as digital output Hall effect devices. These position sensing elements are located so as to provide a signal for each phase at such time as the rotor is in position to result in producing positive torque, that will cause rotation in the desired direction from the energization of that particular phase winding. In the case of a three-phase motor as illustrated here there will be three position sensing devices and, therefore, three signals as represented by waveforms 10, 12, and 14. Referring to waveform 10 as generated by position sense signal A, there may be seen that there is a point labeled PA1, which is indicative of the rotor position at which the current in phase A will begin producing positive torque. Position PA2 indicates the rotor position at which current in phase A will begin producing negative torque. Likewise PB1 and PB2 indicate the positions at which current in phase B will begin producing positive torque and negative torque, respectively. PC1 and PC2 likewise indicate the positions at which current in phase C will begin producing positive and negative torque, respectively.

The center waveform of FIG. 1 is a frequency multiplier output identified as waveform 16. This frequency multiplier output is not to scale. As will be later described herein, this frequency multiplier output is a multiple of the position sense signal frequency such as 512 times the position sense signal frequency thereby dividing each torque cycle of the phase into 512 increments.

Waveforms 18, 20, and 22 shown in the bottom portion of FIG. 1 are labeled phase A timing output, phase B timing output and phase C timing output, respectively. These three waveforms depict the signal that is supplied from the control circuit to a power driver, thus energizing a phase or winding in the motor. The time interval labeled from T01 to T02 is the delay time generated by the control circuit. This delay interval starts at the time when a phase is capable of producing positive torque and lasts for one-half the number of counts of the frequency multiplier that is stored in the delay time register. In other words, this is the time interval between when positive torque may be produced and when positive torque is actually produced by the application of current to the appropriate winding.

The time interval T02 to T03 is the on-time generated by the control circuit. This time interval starts immediately after the delay time interval has elapsed and lasts for the number of counts of the frequency multiplier output that is stored in the on-time register or until the phase is no longer capable of producing positive torque. It may be seen that the interval indicated to be T02 to T03 is contained within the interval that position sense signal A identifies as that region in which positive torque is produced (PA1 to PA2). Hence, in the manner above identified, it may be seen that during each torque cycle of a phase, a selected interval during which the winding may be energized is determined by knowing both the delay-time interval at the start of the period during which positive torque may be produced, labeled PA1, PB1 or PC1 and the on-time interval during which power is applied to the phase. This on-time interval for each phase is that interval represented between times T02 and T03.

The duration of the delay-time and the duration of the on-time are independent. Therefore, the on-time pulse can be positioned anywhere within the time during which a phase can produce positive torque. This will allow optimization of the commutation for improved motor efficiency. In most applications, efficiency is maximized by centering the on-time pulse within the positive portion of the torque cycle of a phase. In some applications it may be desirable to offset the on-time pulse. This also allows for motors wherein the torque intervals overlap to allow separate phases to be energized at distinct times by providing separate delay intervals for each phase, such that it is possible to energize the appropriate winding at the best time for that phase.

Figure 2:
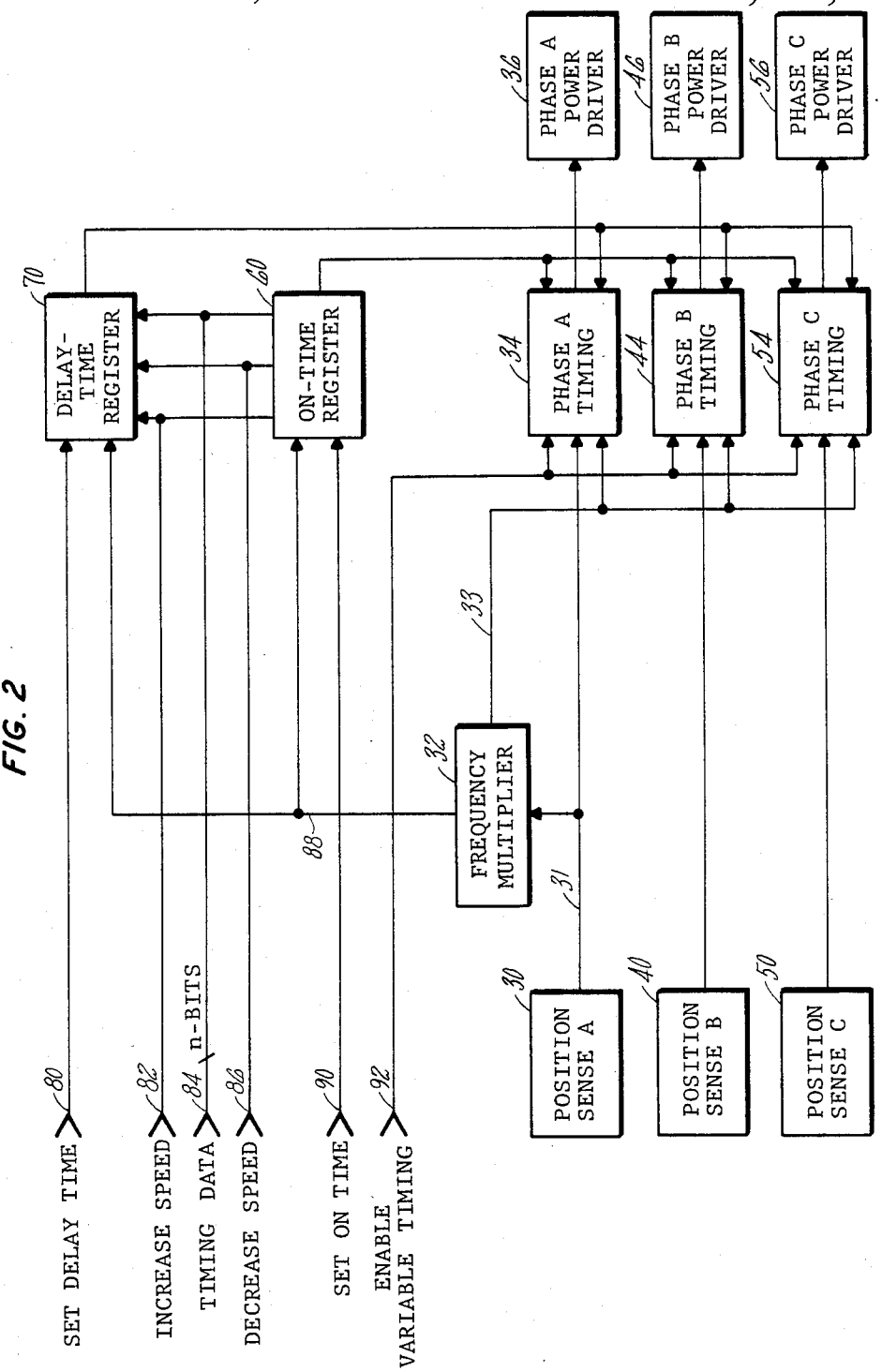
FIG. 2 is a block diagram showing the overall motor speed control.

Referring now to FIG. 2, there may be seen an overview of the entire control circuit. As shown in FIG. 2, position sense indicators 30, 40, 50, one for each phase of the motor, are located to detect the position at which positive torque may be produced by a phase and to generate a signal in response thereto. These signals are directed to phase A timing 34, phase B timing 44 and phase C timing 54, respectively such that the appropriate timing control circuits know the rotor position and when positive torque may be produced. Signal 31 generated by position sense A is also directed to frequency multiplier 32. Frequency multiplier 32 acts to generate a high frequency signal dependent upon the motor speed, which signal 33 is conducted to phase A timing, phase B timing and phase C timing 34, 44 and 54, respectively. Additionally, the frequency multiplier generates a speed change clock signal 88 which is directed to on-time register 60 and delay-time register 70.

At the top of FIG. 2 there may be seen delay-time register 70 having inputs from set delay time 80 and speed change clock signal 88 as well as increase speed signal 82, timing data input 84 and decrease speed signal 86. The on-time register has similar inputs except for the substitute of set on-time 90 instead of set delay-time 80. The delay-time register is utilized to store the time interval for establishing the delay interval between the start of the positive torque producing period and the time when the current is supplied to the winding. The on-time register is utilized to store timing data to control the length of time the current is supplied to the winding. It can be seen that output signals from delay-time register 70 and on-time register 60 are directed to each of the phase timing circuits 34, 44 and 54.

Each phase timing circuit utilizes the input information and generates a signal to respective power drivers, phase A power driver 36, phase B power driver 46 and phase C power driver 56. The signal is generated for the duration of the timer when it is desirable to have the appropriate power driver supply current to the identified phase winding.

Figure 6:
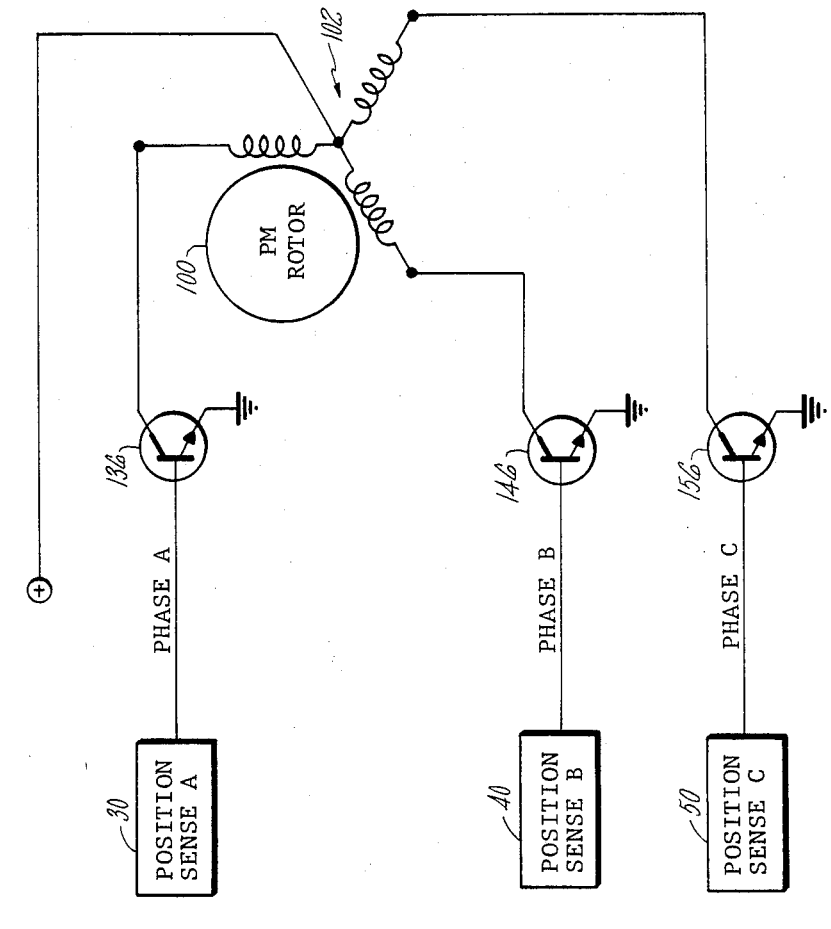
FIG. 6 is a schematic of a typical three-phase, unipolar motor of the type suitable for being controlled by the circuit in accordance with FIG. 2.

Referring briefly to FIG. 6, there may be seen permanent magnet rotor 100 located adjacent to stator windings 102. Position sense blocks A, B and C labeled 30, 40 and 50, respectively, are connected through the remainder of the control circuit (not shown) to control application of power to the stator windings. Transistors 136, 146 and 156 (shown to indicate a type of power driver) are used respectively such that power is gated to the stator windings in response to the signals generated from the sensors of the position sense blocks. The various power drivers may be other types of switching devices than the transistors shown.

Figure 3:
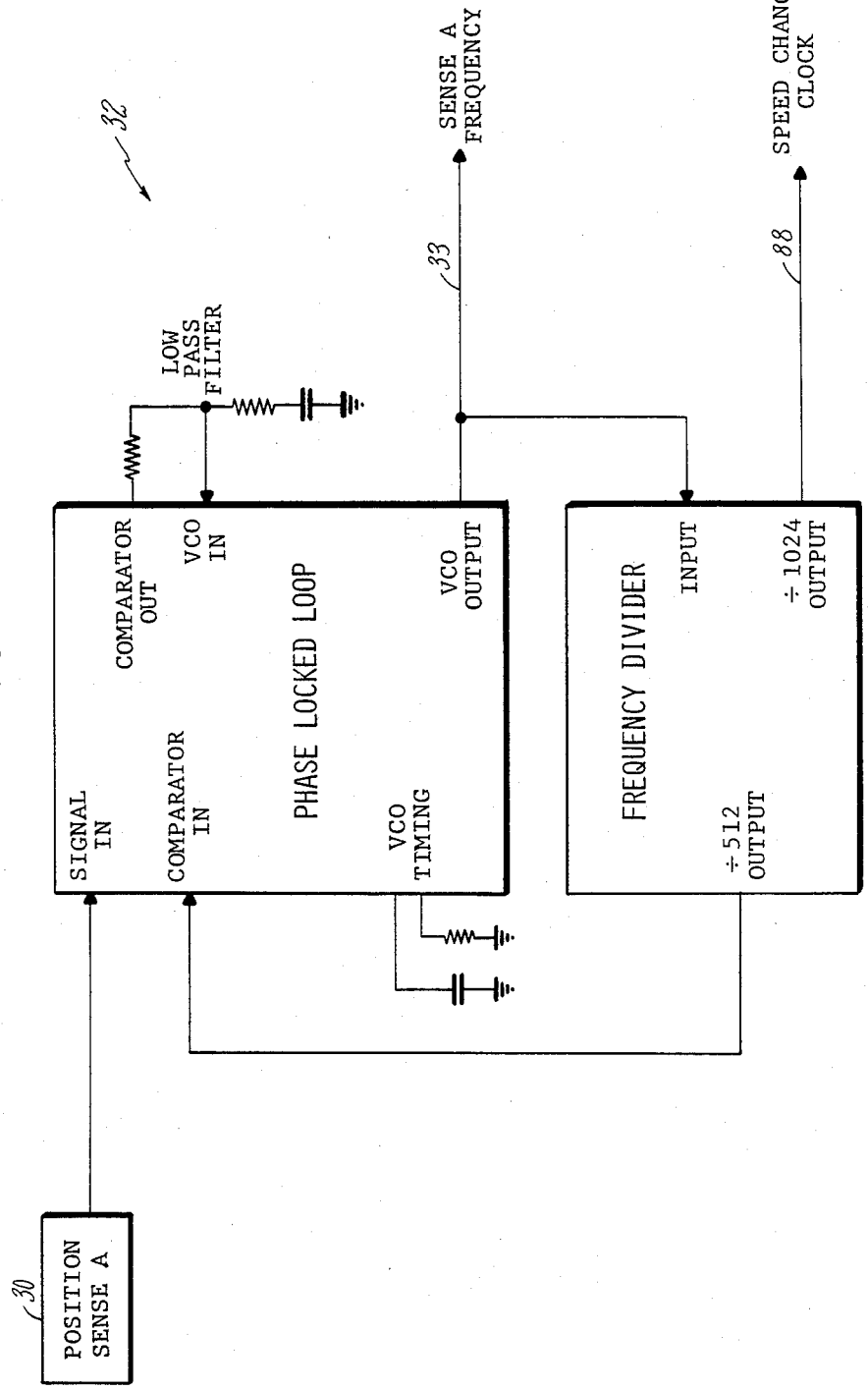
FIG. 3 is a block diagram representing the functions of a frequency multiplier circuit as shown in FIG. 2.
Figure 4:
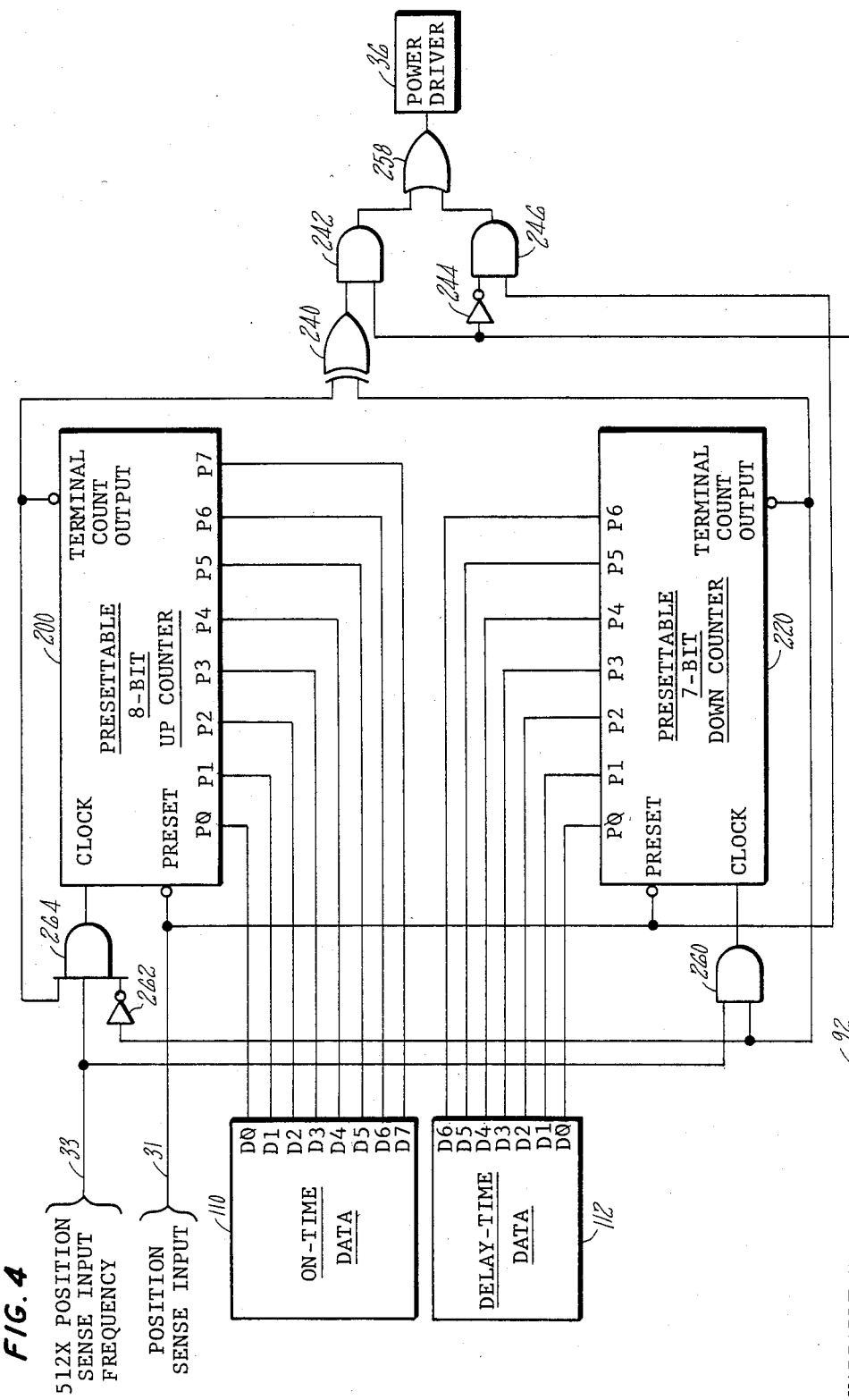
FIG. 4 is a block diagram representing the function of the phase timing as shown in FIG. 2.
Figure 5:
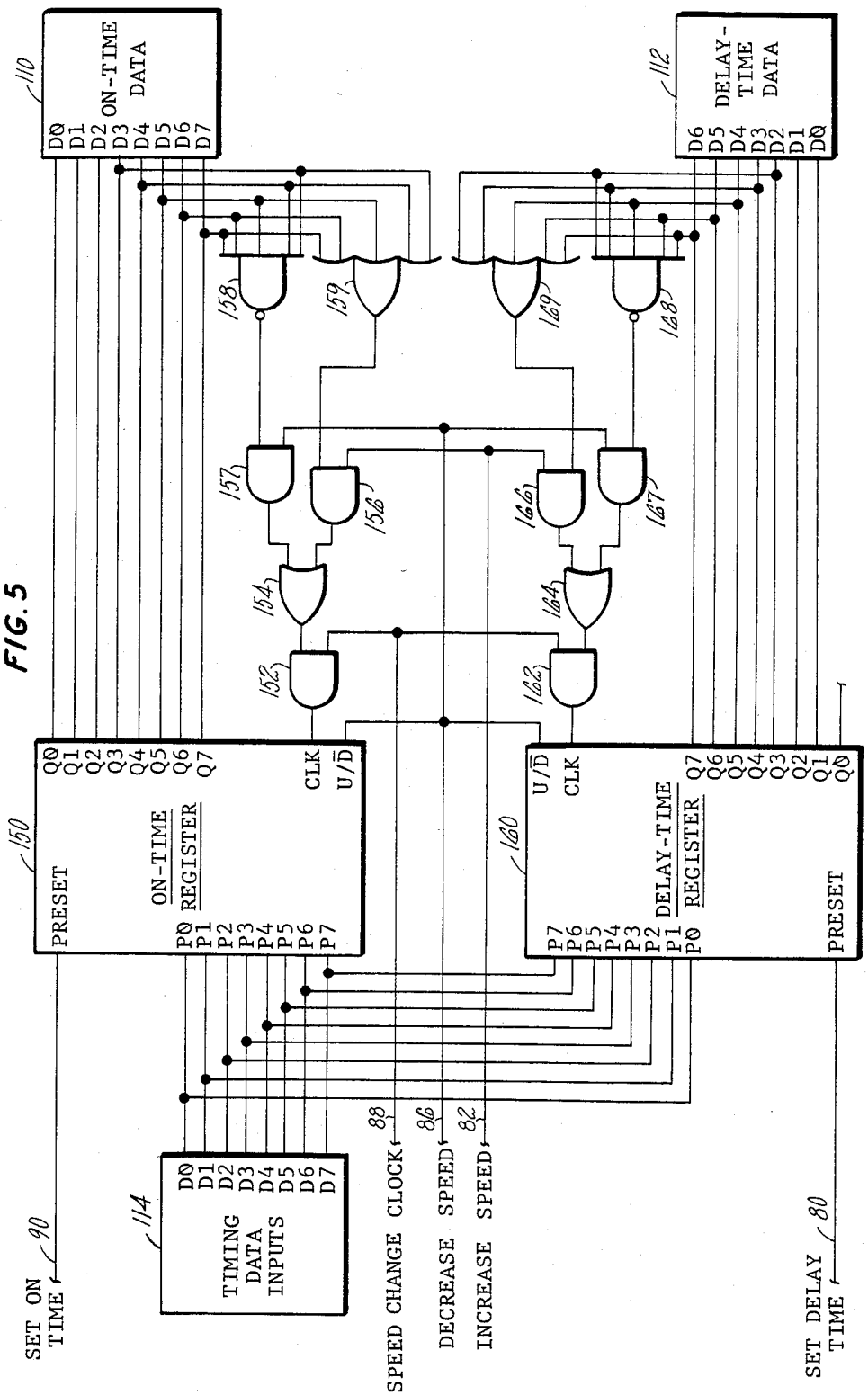
FIG. 5 is a block diagram representing the functions of the delay-time and on-time registers as shown in FIG. 2.

Specific circuit operation can be explained by referring to the phase timing circuit shown in FIG. 4, the delay-time and on-time registers shown in FIG. 5 and the frequency multiplier circuit as shown in FIG. 3. Referring first to FIG. 3, it may be seen that position sense signal A from block 30 is gated to phase-locked loop 32. In FIG. 3 the position sense A signal is used as a reference that has a frequency equal to the frequency of the torque cycle of phase A for the speed at which the motor is turning. Many schemes are available for generating frequency multiplication and different techniques may be used in different applications. As shown, this phase locked loop device includes a frequency divider having a feedback path. A purely digital approach could be used in cases where implementation through a single integrated circuit was desired and would thusly avoid the need for the RC components for setting the phase lock loop's voltage controlled oscillator frequency range and filtering of the control voltage.

The circuit as shown compares the position sense A input frequency to a frequency that is produced by a voltage controlled oscillator (VCO) that has been divided by a factor of 512. The control voltage to the VCO is varied until the two inputs are the same frequency. At this point the sense A frequency (33) is 512 times the electrical frequency of the torque cycle of phase A. Since the VCO frequency is self-adjusting, this frequency multiplication factor is constant over the operating speed range of the motor.

Additional output of the frequency divider is a speed change clock signal 88. This speed change clock signal is at a frequency one-half the position sense A frequency. Other frequencies would work for the speed change clock, but this ratio works well in many cases. The sense A frequency multiplied by 512 is the output signal on line 33.

Referring now to FIG. 5, there may be seen the delay-time and on-time registers. On-time register 150 is shown toward the top of FIG. 5 and delay-time register 160 is shown towards the bottom. Both registers are eight-bit, presettable, up-down counters. Connected to on-time register 150 is set on-time input 90 and a series of timing data inputs 114. A group of signals 110 is represented by on-time data is generated by on-time register 150. This on-time data signal is gated back through NAND gate 158, and OR gate 159 through another series of gates to prevent the on-time register from "rolling over" when it is incremented and decremented. In other words, the clocked values in the up-down counter may vary from zero to 255, however the counter is not allowed to index from 255 to zero or from zero to 255. At either end of the counter further incrementing or decrementing is inhibited.

In like manner delay-time register 160 receives a set delay time input 80 and input from timing data inputs 114. A group of signals 112 represented by delay-time data is generated and this output is likewise gated through NAND gate 168 and OR gate 169, through a gate matrix to likewise control "rolling over" of the delay-time register.

Speed change clock signal 88 is directed through AND gates 152 and 162, respectively to the clock input to each counter. Each counter additionally has an up-down increment-decrement selector which is energized by decrease speed signal 86.

It is contemplated that a typical motor might have three or four preset speeds. These preset speeds would each have appropriate preset timing data which is represented by timing data input signal 114. The operator might have a series of buttons, one each of which will generate an appropriate timing data input to both the counters to obtain the desired motor speed. To set each register from the preset data, the set on-time signal 90 or the set delay-time signal 80 is provided which will latch the data from the timing data inputs into the respective registers. The registers then provide that data as the on-time data or delay-time data output for use by the remainder of the circuit.

When it is desirable to have a motor speed other than the individual presets, then separate inputs may be provided to their increase or decrease the speed from a preset speed. If it is desired to increase the speed, then an increase speed signal is provided over line 82, which is then gated respectively through AND gates 156 and 166, through OR gates 154 and 164 and through AND gates 152 and 162. At AND gates 152 and 162 the presence of the speed change clock signal 88 acts to gate the single input into the appropriate registers incrementing or decrementing them both simultaneously.

Likewise when it was desired to decrease the speed of the motor, a decrease speed signal (86) is provided. This signal is connected to change the direction in which both counters increment or decrement and provides a signal to AND gates 157 and 167 and from there through OR gates 164 and 154 to AND gates 152 and 162 through which an input signal is provided to the counters with each speed change clock signal. In this manner both counters may be incremented or decremented to adjust to the appropriate on-time and delay-time intervals.

Additionally, provided to prevent "roll over" are NAND and OR gates 158, 159 and 169 and 168. Their operation is such that NAND gate 158, for instance will generate a high signal until all of the data lines D3–D7 become high. At that point, NAND gate 158 will generate a low signal which when received by AND gate 157 will have AND gate 157 generate a low signal notwithstanding that the decrease speed signal is still high. With one of these signals low, OR gate 154 will be low and no output will be provided to the on-time register to further increment the on-time register. Hence, in this manner 248 is the highest on-time data that may occur.

In like manner OR gate 159 is connected to data lines D3–D7 and OR gate 159 generates a high signal until all of said data lines are low. Under these circumstances, OR gate 159 goes low and likewise AND gate 156 will be low notwithstanding that the increase speed signal is on. In this manner the on-time register may not decrement below the minimum value of seven. The delay-time register 160 uses similar gates to control "roll over" in a similar manner.

Referring now to FIG. 4, the phase timing circuit will be explained. Shown on the left-hand side of FIG. 4 are on-time data input 110 from the on-time register 150 of FIG. 5 and the delay-time data 112 from the delay-time register 160 of FIG. 5. The appropriate on-time data and delay-time data are received by presettable eight-bit up counter 200 and presettable seven-bit down counter 220. Each of these is preset to the appropriate data input.

Position sense input signal 31 is shown connected to the preset input to both the presettable eight-bit up counter 200 and the presettable seven-bit down counter 220. The 512X position sense input frequency signal 33 is shown gated through AND gate 264 to the clock input of up counter 200 and through AND gate 260 to the clock input of down counter 220. The terminal count output from up counter 200 is gated to AND gate 264 and to exclusive OR gate 240. The terminal count output from down counter 220 is gated to exclusive OR gate 240, to AND gate 260 and through inverter 262 to AND gate 264.

Position sense input 31 is also connected to AND gate 246 and therethrough to OR gate 258 to power driver for phase A 36. Variable timing enable input 92 is connected through inverter 244 to AND gate 246 and to AND gate 242.

Hence when the variable timing enable input 92 is not energized indicating that the variable timing feature is not desired, then the variable timing circuit will be disabled since AND gate 242 will have a low input. In such event the position sense signal 31 will be gated directly to AND gate 246 and the low signal from variable timing enable signal 92 will be inverted in inverter 244 and also directed to AND gate 246. In this manner AND gate 246 will go high whenever the position sense signal is high. This high signal will be gated through OR gate 258 to drive power driver 36. Hence, when the variable timing enable signal is off, the power driver is driven in response to position sense input 33.

When the variable timing enable signal is on, the power driver is driven in response to the exclusive OR gate 240 output. When the variable timing enable signal is high, inverter 244 converts said signal to a low signal thereby effectively preventing AND gate 246 from energizing power driver 36 notwithstanding the position sense input signal.

The position sense input acts, when it goes low, to preset both counters by latching the values obtained from the on-time register and the delay time register into the counters. At the same time the terminal count output of each counter goes high. Since both terminal count outputs are high, both inputs to exclusive OR gate 240 will be high and the power driver will not be energized.

It will be noticed that the connection from the delay-time data to the presettable down counter is such that the delay-time from the delay-time register is divided in half before being provided to the down counter. This is accomplished by simply ignoring the least significant bit from the data and using a seven-bit down counter instead of an eight-bit down counter. The purpose of this is to allow the set on-time and set delay-time inputs to be activated simultaneously. If the on-time for a phase is to be centered within the positive torque portion of the cycle, by dividing by two, half of the off-time is placed at the beginning of the positive torque portion of the cycle, and half is placed at the end of the positive torque portion of the cycle. Hence, the on-time interval is centered in the positive torque portion of the cycle by dropping the least significant bit from the delay-time register.

When the position sense input for the associated phase is low, the two presettable counters are held in the present condition with the up counter containing the on-time data and the down counter containing the delay-time data. When the up counter increments to its maximum count, the terminal count output then switches from high to low. When the down counter decrements to zero, its terminal output switches from high to low. Otherwise, the terminal count pin or output in each counter is high.

When the position sense input goes high indicating that the associated phase is capable of producing positive torque, then the down counter begins counting at the rate of 512 times the position sense input frequency. The up counter is inhibited from counting because the down counter's terminal output is inverted and used to gate the 512X clocks into the up counter. The output of the exclusive OR gate is low because both terminal count pins are high. Both inputs to the exclusive OR gate remain high until the down counter decrements to zero. At that time, the terminal count output goes low and inhibits any additional clock pulses to the down counter by AND gate 260. At the same time the terminal count output is inverted at inverter 262 and begins allowing 512X clock pulses through AND gate 264 into the up counter. The inputs to the exclusive OR gate are now different, the terminal count output of the down counter is low and the terminal count output of the up counter is high. This causes a high level from the output of the exclusive OR gate 240 and energizes the power driver through AND gate 242 and OR gate 258. This condition remains until the up counter reaches it terminal count and the terminal count output goes low. This inhibits additional clock pulses to the up counter and AND gate 264 and causes the two inputs to exclusive OR gate to be the same once again, both low. This condition causes the output of the exclusive OR gate to go low, removing the high level to the output driver. This condition remains until the position sense inputs go low once again, placing both counters in a preset condition with both terminal count outputs at a high level. The inputs of exclusive OR gate are still the same, both being high, and the output driver is not turned back on until the cycle is repeated.

Additional means may be provided to allow the timing data input to the registers to be varied independently. In this matter, the positioning of the on-time pulse may be varied within the positive torque producing portion of the cycle. Furthermore, circuit means may be added to allow one set of registers to control each phase of the motor.

The invention has been described with reference to a particular embodiment. It is to be understood by those skilled in the art that variations and modifications can be effected within the spirit and scope of the invention.

We claim:

1. A digital speed control circuit for an electric motor having a phase winding which is selectively energized to apply force to a rotor which comprises:
   means for receiving an input signal indicative of the rotor position;
   delay means for providing a delay interval;
   on-time means for providing an on-time interval during which a phase winding should be energized; and
   logic means for generating a driver signal to cause said phase winding to be energized, said logic means acting to initiate the delay means to provide the delay interval upon the receipt of the input signal and to initiate the on-time means after the delay interval has elasped, said logic means further acting to generate said drive signal for the duration of the on-time interval.

2. The apparatus as set forth in claim 1 wherein the delay means further comprises a delay counter, a delay time register connected to the delay counter for latching a value into the delay counter and clock means for indexing said delay counter to provide the delay interval.

3. The apparatus as set forth in claim 2 wherein the on-time means further comprises an on-time counter, an on-time register connected to the on-time counter for latching a value into the on-time counter and means for receiving a clock signal to index said on-time counter to provide the on-time interval.

4. The apparatus as set forth in claim 3 and further comprising:
timing data input means connected to provide selected values to the delay time register and the on-time register.

5. The apparatus as set forth in claim 3 wherein the delay time register and the on-time register comprise:
input means to increment or decrement the registers.

6. The apparatus as set forth in claim 5 wherein the delay time register and the on-time register further comprise:
control means for preventing the registers from "rolling over".

7. The apparatus as set forth in claim 1 wherein the means for receiving an input signal comprises a Hall effect sensor positioned to generate a signal when the application of current to the phase winding is capable of producing a positive torque upon the rotor.

8. The apparatus as set forth in claim 1 wherein the electric motor has multiple windings and which comprises means for receiving an input signal, delay means, on-time means and logic means for each winding.

9. A control circuit for a brushless motor having a rotor and at least one winding which comprises:
a rotor position detecting means that provides a signal input to a frequency multiplier circuit;
a delay-time register and an on-time register each of which receives an input signal from the frequency multiplier circuit;
a phase timing circuit that receives a signal from the rotor position detecting means, a signal from the frequency multiplier circuit and signals from the delay-time register and the on-time register and generates an output signal based on the values of the received signals; and
a driver circuit for each phase winding of the motor that receives the output signal from the phase timing circuit and which supplies a pulse of current to the motor winding at optimum position of a rotor within the motor to produce maximum torque and for a duration to sustain a preselected rotor speed.

10. The apparatus as set forth in claim 9 wherein the phase timing circuit further comprises a delay time counter which is clocked at the rate provide by the frequency multiplier to provide the delay interval between the receipt of a signal from the rotor position detecting means and the generation of an output signal.

11. The apparatus as set forth in claim 10 wherein the phase timing circuit further comprises an on-time counter which is clocked at a rate provided by the frequency multiplier after the delay interval has elapsed, the output signal indicating to the driver circuit to supply power to the winding during the interval the on-time counter is counting.

12. An electronically controlled motor including a rotor supported for rotational movement and a motor field which comprises:
a rotor position detection means for generating a position signal when the rotor is positioned relative to a winding such that the application of current to the winding will result in positive torque being applied to the rotor;
a driver circuit for each winding of the motor, said circuit receiving a driver signal and supplying a pulse of current to said winding for the duration of said driver signal; and
logic means connected to receive the position signal and to generate a driver signal, said logic means including delay means for providing a delay interval between the receipt of the position signal and the generation of the driver signal and on-time means for providing the duration of the driver signal.

13. The apparatus as set forth in claim 12 wherein the delay means comprises a delay register containing preset values and a delay counter, said delay counter counting from the delay register value at a preselected rate to provide the delay interval.

14. The apparatus as set forth in claim 13 wherein the delay counter is connected to the delay register such that the delay counter receives a value equal to approximately one-half the value in the delay register.

15. The apparatus as set forth in claim 14 wherein the on-time means comprises an on-time register containing preset values and an on-time counter, said counter being indexed from the on-time register value at a preselected rate to provide the on-time interval.

16. A method of controlling a motor having a rotor and at least one winding which comprises the steps of:
sensing when the rotor is in a position relative to the winding such that the application of current to the winding will result in positive torque being applied to the rotor and generating a signal;
providing a delay interval which begins upon the detection of the signal;
providing an on-time interval which begins upon the expiration of the delay interval and generating a driver signal during this on-time interval; and
supplying power to the winding to power the rotor upon the detection of the driver signal.

17. The method as set forth the claim 16 wherein the steps of providing the delay interval and providing the on-time interval act in combination to provide the driver signal during that portion of the rotation of the rotor when the torque is maximized for the current supplied to the winding.

18. The method as set forth in claim 16 wherein the steps of providing the delay interval and of providing the on-time interval act to control rotor speed.

19. The method as set forth in claim 16 wherein the steps of providing the delay interval and determining determining the on-time interval comprise establishing delay intervals in a digital circuit.

* * * * *